United States Patent [19]

Franco et al.

[11] Patent Number: 5,200,095
[45] Date of Patent: Apr. 6, 1993

[54] ECOLOGICAL PROCEDURE FOR THE TREATMENT AND COMPLETE RECOVERY OF SLUDGE FROM SUGARED FRUIT CONCENTRATES

[75] Inventors: Carlos A. P. Franco, Villanueva De La Canada; Carlos M. Sanchez, Tarancon, both of Spain

[73] Assignee: Energia e Industrias Aragonesas, S.A., Spain

[21] Appl. No.: 779,863

[22] Filed: Oct. 21, 1991

[30] Foreign Application Priority Data

May 16, 1991 [ES] Spain .................................. 9101186

[51] Int. Cl.$^5$ ............................................... B01D 37/00
[52] U.S. Cl. ..................................... 210/781; 210/787; 210/806
[58] Field of Search ................ 210/780, 781, 783, 784, 210/789, 787, 788, 806, 360.1, 245, 244, 247, 224, 304, 244, 241; 494/27, 37

[56] References Cited

U.S. PATENT DOCUMENTS

| | | | |
|---|---|---|---|
| 4,015,772 | 4/1977 | Hemfort | 494/27 |
| 4,711,729 | 12/1987 | Rudroff | 210/789 |
| 4,737,285 | 4/1988 | Krulitsch et al. | 210/224 |
| 4,754,610 | 7/1988 | Knodel et al. | 62/74 |
| 4,772,402 | 9/1988 | Love | 210/244 |
| 4,781,809 | 11/1988 | Falcone, Jr. | 204/182.4 |
| 4,784,769 | 11/1988 | Giordano, Jr. et al. | 210/500.21 |
| 4,952,127 | 8/1990 | Schmeisser et al. | 494/37 |
| 5,021,166 | 6/1991 | Torpey | 210/360.1 |

FOREIGN PATENT DOCUMENTS 0351363 1/1990 European Pat. Off.
2562392 10/1985 France.

OTHER PUBLICATIONS

Chemical Abstracts, 99:4365q, "Membrane purification of juices", vol. 99, p. 412, 1983.
Chemical Abstracts, 105:132060r, "Centrifuges optimize tartrate removal", vol. 105, p. 159, 1986.
Chemical Abstracts, 106:195012t, "Clarification of juice from Isabella grapes", vol. 106, p. 621, 1987.
Chemical Abstracts, 106:4059f, "Filtration of beverages", vol. 106.
Chemical Abstracts, 107:153206z, "Fining and clarification of plant–derived beverages", vol. 107, p. 603, 1987.
Chemical Abstracts, 109:229205n, "Clarifying and stabilizing of products from processing of grapes", vol. 109, 1988.
Chemical Abstracts, 110:56293e, "The influence of calcium on cyrstallization of tartar", vol. 110, 1989.
Chemical Abstracts, 111:7677n, "Manufacture of fruit and vegetable juices by separation of juices from pulp using lime", vol. 111, p. 644, 1989.
Chemical Abstracts, 112:97309z, "Reduction of potassium levels of fruit juices with calcium–charged ion exchanger", vol. 112, p. 639, 1990.
Chemical Abstracts, 113: 170706d, "Use of ultrafiltration in the stabilization of grape juices with respect to tartrate", vol. 113, p. 593, 1990.

Primary Examiner—Robert A. Dawson
Assistant Examiner—David Reifsnyder
Attorney, Agent, or Firm—Bacon & Thomas

[57] ABSTRACT

A method for treating sludge from sugared fruit concentrates is disclosed. The method comprises treating a homogenized dipersion of the sludge in a phase separator followed by filtration-precipitation and separation.

9 Claims, No Drawings

ECOLOGICAL PROCEDURE FOR THE TREATMENT AND COMPLETE RECOVERY OF SLUDGE FROM SUGARED FRUIT CONCENTRATES

OBJECT OF THE INVENTION

The purpose of this Invention is to develop a procedure for treating concentrated solutions of fruit juice, particularly concentrates of grapes and raisins, such that the content of sugars in the sludge is reduced, leaving this sludge in a usable condition, avoiding its dumping or later purification, and at the same time reducing the energy consumption of conventional systems.

BACKGROUND OF THE INVENTION

The background of this Invention lies on the one hand in the efforts currently being made to reduce or eliminate dumping in order to reduce the sources of environmental pollution of industrial origin, and on the other hand, in the repeated attempts to utilize starting products as completely as possible, all within the framework of several procedural guidelines which also make it possible to reduce energy consumption.

As is well known, the agriculture/food industries have a strong impact, both with respect to the $BOD_5$ of their waste and with respect to materials in suspension, and among these, those relating to grape and raisin juices have a markedly high content, to the point of requiring a $DBO_5$ higher than 1,400 mg/l of sugared solution adsorbed in the sludges or argols, together with some materials in suspension in concentrations higher than 600 mg/l, also with reference to absorbed solution. To these one must add the requirements of the argols themselves, which are even higher due to their specific nature as organic acids and salts of medium molecular weight, which results in occasional resorting to fradulent dumping of waste in order to avoid the cost of treatment.

In conventional processes, the obtaining of concentrates of grapes, raisins, and other fruits is carried out by subjecting the initial juice to successive concentrations by evaporation to obtain a final syrup which has a concentration of approximately 70° Brix.

In the preceding process, however, a large number of organic salts or acids having two to nine carbon atoms are precipitated, so that these are separated by means of successive static decantings, with long durations, which entails the initial decanting of another series of substances which are more or less colloidal, which, in addition to increasing the degree of impurities in the argols, making it impossible to utilize them subsequently, reduces the later stability of the juices, as they are separated from them.

What is more, however, the particle size of these sludges produces high levels of adsorption in the sugared solution, resulting in a loss of yield.

Under these conditions, utilization of the argols for other purposes is impossible.

To sum up, the drawbacks of the conventional process are as follows:

a) The nature of the concentrated syrups, together with their high viscosity, makes the decanting process slower and deficient, because it may be incomplete in relation to the argols, while, given the slowness of the process, undesired precipitation of natural stabilizing compounds, such as gelatins or pectins which are initially contained in the syrup in a colloid state, may occur.

b) Separation of phases is difficult because an interface zone, which must be incorporated into the sludge, is always produced, and this must be eliminated if one wishes to guarantee the quality of the final juice.

c) The massive incorporation of sugars, or in a smaller proportion polysaccharides such as gelatins, into argols limits the possibility of their use, both due to their inherent composition and due to the problems of storage and transport in view of the risk of proliferation of fermentation processes. This makes it necessary to destroy the argol, causing an increase in costs, and what is worse, direct dumping with the ecological impact we have discussed above.

The method carried out to date to recover sugars adsorbed in the sludges and to reduce, if not completely avoid, contamination of these sludges, consists of a series of successive washings of the sludges or argols with water, such that the adsorbed sugar solution progressively decreases in concentration as the number of stages of washing increases. Naturally, during these washings, parts of the organic compounds contained in the argols may once again dissolve, with the result that it is necessary to use cold or chilled water, with the additional consumption of energy that this requires, in order to reduce the solubility of the sludges. In this manner, the more efficient the separation of sugars by washing, the more organic acids and salts, oxalates, bioxalates, tartrates, bitartrates, and citrates return to the sugared solution. On the other hand, the wash water which, once it has been separated by decanting, has widely varying concentrations between 2° and 30° Brix, must be concentrated to a level of 60°-70° Brix for reincorporation in the juice cycle, which entails a new and high consumption of energy. This explains the fact that this water purification stage is frequently dispensed with, taking on the risk of generating unusable argols. The composition of unpurified argols or argols washed with one or two steps is as follows:

Sugar: 30–50%
Water: 18–25%
Other substances: 30–40%

That means, the proportion of sugars to actual sludges may reach a level of 1:1, which gives an idea of both the losses and the degree of sugar contamination of the argols themselves.

The procedure which is the object of our Invention overcomes all of the difficulties described by improving yields of recovery of sugar, reducing the presence of sugars in argols, reducing the time of decanting of same, and eliminating the processes of washing and the resulting recovery of these sugars, which in turn reduces the energy consumption of the process.

DESCRIPTION OF THE INVENTION

The Invention which is the object of this Patent provides a rapid and clean method for complete utilization of raw fruit juice concentrates, while also providing two flows of substances, juices free of sludge on the one hand and sludge on the other, having a low content of sugars and other polysaccharides, which makes them capable of subsequent reutilization.

The invention is based on confirmation of the fact that once precipitation of argols is initiated, this precipitation can be accelerated, as these argols act as crystallization nuclei, making it possible in an initial separation of phases, preferably dynamic, to reduce the content of solids in the liquid phase to less than 10%.

These solids, on the other hand, continue to act as crystallization nuclei, resulting in the obtaining, in a second filtration, of a sugared juice which is virtually free of solids. What this means is that the Invention relies precisely on reducing the residence time in separation of phases, unlike conventional processes, avoiding the formation of diffuse interfaces which increase viscosity, reduce particle size, and increase the capacity for absorption. In the present case, on the contrary, the first substrate of argols acts as a precipitation or crystalization nucleus during the operation of phase separation itself, which means that the drainage of the sugared juice from the argols takes place in two stages of brief duration, provided that formation has at least begun in the initial juice.

The simplest practical form of execution of the Invention, although it may have variants, consists of passing the fruit concentrates having a solid content of between 2 and 80% through a continuous centrifugal separator or some other continuous filtering system from which a useful liquid is produced having a solid content which is always below 10%, which is then passed through another filtration system which leaves the sugared juice virtually free of solids.

Instead of the centrifugal filter, one may use any other system of dynamic or static decanting which guarantees the initial formation of a low number of precipitation nuclei and contact with the stock solution to facilitate and guarantee the growth of nuclei and the precipitation of argols.

A characteristic of the process is that, given the short residence times and the resulting relatively small size of the equipment required, it lends itself to construction in the form of a compact mobile installation which can be taken to the actual installations, whether or not they have washing systems, depending on the operating procedures of the companies in the sector.

Both the argols separated in dynamic filtration and those of the second stage are mixed, obtaining a product whose components vary depending upon the original fruit, with the essential components being monoacidic tartaric salts and salts of malic acid in grapes or raisins; citric acid and malic acid in the case of oranges; and malic acid and quinic acid in apples, if a sufficient degree of ripening has not been reached, etc.

What is important, in any event, is that the argols have a composition whose content can be put to beneficial use such that there is no residue, and not even sub-products remaining, because these substances are converted into raw materials for other industries.

PREFERRED EMBODIMENT OF THE INVENTION

Now that we have described the stages and basis of our Invention and the process which is protected, we shall now give a detailed description of the preferred operating conditions and the intervals of flexibility of the thermodynamic variables of the process.

The juice concentrate must have a concentration in degrees Brix of 30°-70°, and the precipitation of argols must at least have been initiated, but there must be no interfaces produced. The concentration of argols, without interfaces, may be highly variable, with a minimum of 2%.

The feeding flow will depend on the volumes to be treated, but in any event, the residence time in the initial equipment for filtration, centrifugation, or separation may be between 0.05 and 15 minutes. The temperature may not be higher than 50° C.

The separated liquid, whose concentration of sugars is constantly maintained with respect to feeding, contains between 2 and 5% of solids in suspension and another fraction not higher than 5% of precipitable dissolved solids. For its part, the solid separated in this first stage may not contain more than 12-15% moisture, for which reason the design of the appropriate equipment plays a fundamental role.

The liquid of the first stage passes to the second filtration stage immediately after leaving the first, with filters, filter presses, or any other similar device, followed by various cylinder filters being used at the same temperature for this stage.

The solids retained in both filtering processes are combined and have the following composition:
Sugar: 8-12%
Water: 12-20%
Other substances: 65-75%

As can be seen, with respect to the solids in conventional processes, this composition is much richer in "other substances" and poorer in sugars, without requiring energy consumption in concentrations. These solids are sent for recovery of their content of organic salts or acids.

In the following paragraph, we shall present an illustrative example of the Invention, which, however, is by no means limitative.

A concentrate of grape juice of 65° Brix and a content of solids in suspension (argols) of 45% by weight is fed in the form of a homogenized dispersion into a centrifuge having a useful capacity of 50-75 l with a flow rate of 50 l/minute, obtaining a solid having a moisture content of 12% and a liquid containing 2% by weight of solids in suspension and 1.5% of precipitable soluble solids. The liquid passes directly from the outlet flow of the centrifuge to a filter press followed by three cylinder filters, from where the commercially useful sugar solution is recovered. The solids separated in the two stages are combined, after which they have a moisture content of 13.2%, and are sent for recovery of their tartaric content.

Now that we have sufficiently described the nature of the Invention and its practical mode of embodiment, we must add that the foregoing specifications can be varied in detail provided that their fundamental principle is not changed, with this fundamental principle constituting the essence of the Invention, for which a Patent is requested.

We claim:

1. An ecological procedure for the treatment and complete recovery of sludge from sugared fruit juice concentrate which contains sludge dispersed therein; said processing comprising the steps of:
   (a) subjecting said fruit juice concentrate to a first phase separation step to separate sludge from said fruit juice concentrate; said first phase separation being conducted under temperature conditions and residence time to cause the precipitation of sludge from the juice concurrently with the phase separation and to form a stream of fruit juice concentrate having a suspended solids content of 2 to 5%; said first phase separation being conducted at a temperature of 2° to 50° C. and a residence time of 0.05 to 15 minutes;

(b) subjecting said stream of fruit juice containing 2 to 5% suspended solids to a second phase separation wherein sludge is precipitated and removed from the juice to produce a stream of concentrated fruit juice substantially free of sludge;

(c) recovering said sludge from said first and second phase separation steps.

2. The process of claim 1 wherein the temperature during the first phase separation is 15° to 35° C.

3. The process of claim 2 wherein the residence time during said first phase separation is 0.1 to 10 minutes.

4. The process of claim 1 wherein the residence time during said first phase separation is 0.1 to 10 minutes.

5. The process of claim 1 wherein the stream of fruit juice concentrate having a suspended solids content of 2% to 5% is passed to said second phase separation via a filter press and at least one brightening filter.

6. The process of claim 1 wherein said stream of fruit juice concentrate having a suspended solids content of 2% to 5% is passed directly to said second phase separation without passage through an intermediate rest tank and without passage through a surge tank.

7. The process of claim 1 which is conducted on a mobile base.

8. The process of claim 1 wherein the first phase separation step is conducted in a centrifuge.

9. The process of claim 1 wherein the first phase separation step is conducted in a filter.

* * * * *